June 21, 1938.  L. M. FRANCIS  2,121,245
TANDEM WHEEL TRAILER
Filed Aug. 13, 1934  2 Sheets-Sheet 1
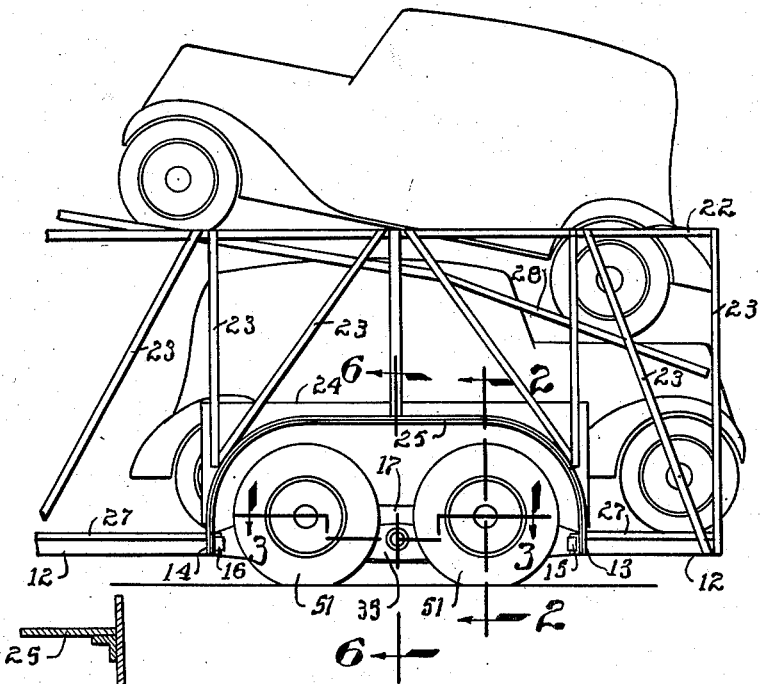
Fig. 1
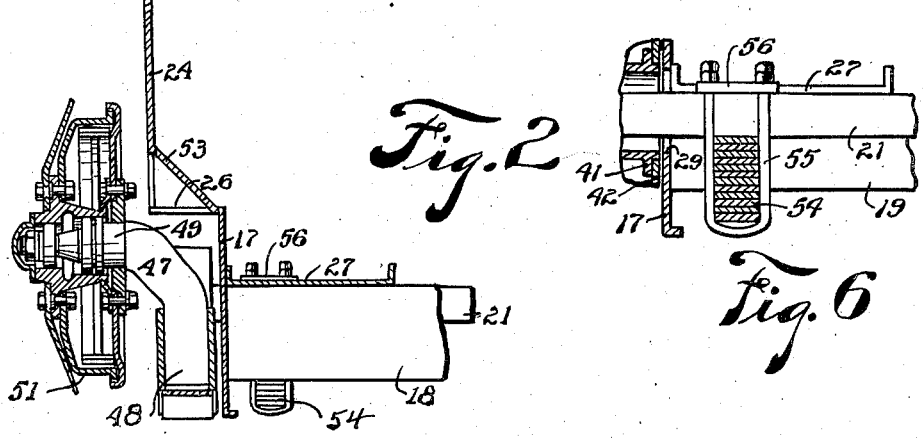
Fig. 2
Fig. 6
INVENTOR.
LYNN M FRANCIS
BY Joseph Farley
ATTORNEY.

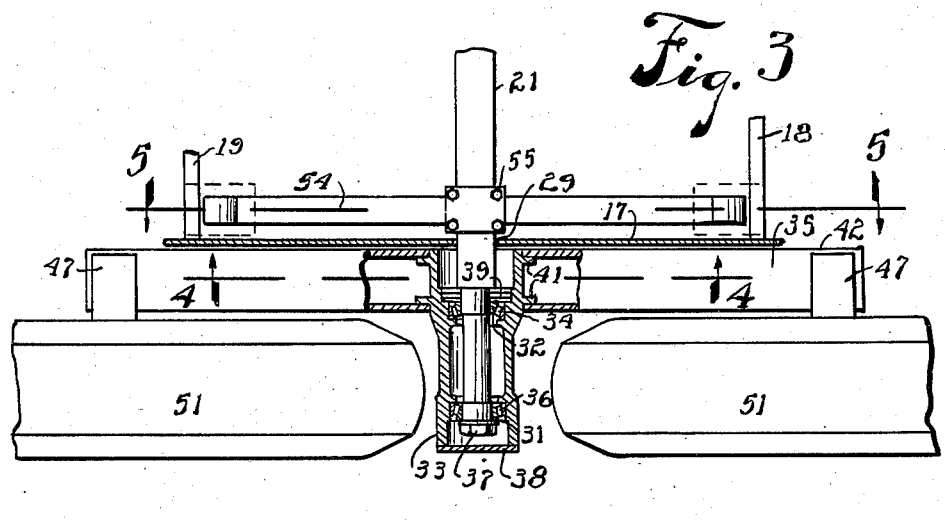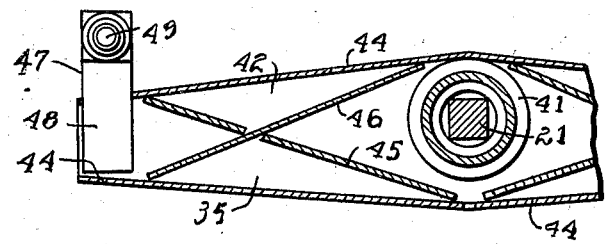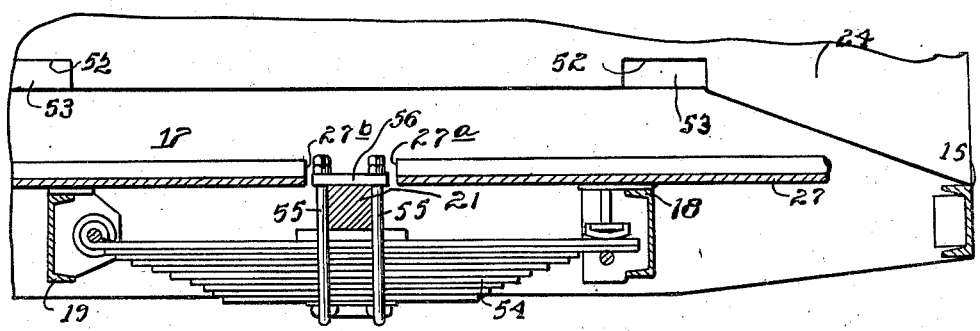

Patented June 21, 1938

2,121,245

UNITED STATES PATENT OFFICE 2,121,245

TANDEM WHEEL TRAILER

Lynn M. Francis, Birmingham, Mich., assignor to Mechanical Handling Systems Inc., Detroit, Mich., a corporation of Michigan Application August 13, 1934, Serial No. 739,529

11 Claims. (Cl. 280—80)

This invention relates to vehicle construction, and in particular to the design of a new and improved running gear for conveyances operating on highways.

One object of this invention is the provision of a vehicle construction having a minimum clearance between the floor of the vehicle and the road bed, thereby affording a maximum usable space in a vehicle of given height. This object is deemed particularly important in view of numerous statutory regulations in the various states setting a maximum height for vehicles operating on public highways, and thereby making it advantageous to bring the usable space of a vehicle as near the road as possible.

The present invention has particular importance in connection with vehicles of the so-called haulaway type, which are used in large numbers to transport in one load a number of finished automobiles from the manufacturing plants to the distributors. Although numerous vehicles of this type are in use, there are objectionable features in constructional details thereof in many particulars. For example, due to the aforementioned statutory restrictions, vehicles of this type have heretofore been constructed without a spring suspension. This construction results in a destructive jarring of the vehicle and its load, possible injury to the load itself and a rapid deterioration of the vehicle. It is accordingly another object of this invention to provide a spring suspension for this type of vehicle which at the same time will not increase the height of the vehicle.

Another object of the invention is to improve upon that type of vehicle in which is used a running gear having two wheels adjacent one another on each side of the vehicle and mounted in tandem on the ends of walking beams. This type of running gear has many advantages, for example an irregularity in the road bed will cause, as the vehicle rolls over the same, displacement of the axle only half as great as in the ordinary construction. Moreover, in the tandem construction, the weight of the vehicle is distributed over a greater number of wheels and transmitted to a larger surface of the road, which is important in view of the numerous statutory regulations in the various states limiting the vehicles operating on public highways to a fixed maximum loading per wheel.

In the previous running gear constructions embodying walking beams, great difficulty was encountered in constructing rigid, yet light, walking beams and in properly and satisfactorily mounting them on the axle. In the conventional construction the bearings frequently yielded somewhat and the walking beams themselves, after the severe jarring to which they were inevitably subjected, would bend out of shape causing the wheels to fall out of alignment and operate in some plane other than a plane perpendicular to the axle. Perhaps one reason for the failure of the bearings and the bending of the walking beams was the fact that the walking beams, functioning as levers on the ends of which the entire weight of the vehicle was supported, were subjected to great forces and moments, which they and the bearings on which they were mounted, could not withstand. As a result of this misalignment, the wheels of the vehicle would be directed at an angle to the line of travel of the vehicle and at an oblique angle to the surface of the road. Although these angles might be slight, the former nevertheless caused a substantial increase in the wear on the tires, and the latter caused the tread to wear more rapidly on one side of the tire than on the other; both resulting in increase of expense. This invention obviates and protects against this misalignment of the wheels and consequent wear on the tires in three ways. First, by journaling each walking beam on the axle through two oppositely inclined roller bearings spaced from one another so as to be well adapted to withstand the moments to which the axle is subjected. Second, by positioning the bearings, one on either side of the plane of the wheels, so that the upward forces on the wheels are transmitted to the bearings as upward forces and not as moments of force. Third, by providing a new type of walking beam which is extremely strong and rigid in all directions, yet light and inexpensive.

As mentioned before, vehicles incorporating the walking beam type of running gear, have heretofore not been supplied with a spring suspension. This may be attributed to the fact that no satisfactory way has been devised for interposing springs between the axle and the frame of the vehicle which would not greatly increase the height of the vehicle. This invention, by taking advantage of the fact that only small clearances are necessary between the axle and the frame where the wheels are on the ends of walking beams, by providing a new type of frame furnished with holes on either side of the lower members through which the ends of the axle project; and by mounting the axle above the spring, allows the interposition of springs between the axle and the vehicle without increasing the height of the vehicle.

Where vehicles of this type are used for transporting automobiles they are usually provided with parallel runways on which the automobiles are rolled into the vehicle. It is a further object of this invention to provide runways positioned in substantially horizontal relationship with the axle so as to increase the usable space within the vehicle.

A further object of this invention is the provision of a new and improved type of stub axle disposed on the ends of a walking beam and designed so that the axis of the walking beam is substantially below that of the wheels, thus lowering the center of gravity of the vehicle.

The above and other objects of the present invention will be readily apparent from the following more detailed description and by reference to the accompanying drawings forming a part hereof wherein is shown a satisfactory, practical and commercial embodiment of a vehicle construction constructed in accordance with the principles of this invention; the embodiment chosen in order to illustrate the invention is a trailer intended to be towed on public highways and adapted to transport a plurality of finished automobiles in decked or semi-decked relationship.

Referring to the drawings:

Fig. 1 is a fragmentary elevational view of a portion of a trailer incorporating the principles of this invention and loaded with automobiles to be conveyed, said portion being taken in the vicinity of the running gear;

Fig. 2 is a vertical transverse sectional view taken substantially along the lines 2—2 of Fig. 1 looking in the direction of the arrows;

Fig. 3 is a horizontal sectional view taken along the lines 3—3 of Fig. 1 looking in the direction of the arrows;

Fig. 4 is a fragmentary, vertical, longitudinal, sectional view of the walking beam taken along the lines 4—4 of Fig. 3 looking in the direction of the arrows;

Fig. 5 is a fragmentary, elevational view, taken along the lines 5—5 of Fig. 3, showing in greater detail the construction of the trailer in the vicinity of the wheel housing; and Fig. 6 is a fragmentary, vertical, transverse sectional view taken along the lines 6—6 of Fig. 1 looking in the direction of the arrows.

Although the drawings illustrate only one side of this vehicle, it is understood that the other side is constructed in the same manner.

As shown in the drawings the frame work of the trailer consists of longitudinally extending lower frame members 12 on each side of the vehicle at the extreme outer and lower edges thereof. The frame members 12 are interrupted at points 13, 14 oppositely disposed on each side of the vehicle forwardly and rearwardly respectively of the wheels 51 in order that a wheel housing may be formed. A transversely extending channel 15 forward of the wheels, connects the frame members 12 at points 13 and a similar transversely extending channel 16 rearward of the wheels connects the frame members 12 at points 14.

Referring to Fig. 5 longitudinally extending plates 17 on each side of the vehicle and inwardly disposed from the frame members 12, connect channels 15 and 16. Transversely extending channels 18 and 19 disposed forwardly and rearwardly of the axle 21 connect the plates 17. The parts thus far described comprise what might be termed, the lower frame, or floor work of the vehicle.

Channels 22 extend longitudinally on each side of the vehicle at the upper edges of the frame. Between the upper channels 22 and the lower framework, extend a large number of vertical and diagonal members 23, which form a truss work on each side of the vehicle, and lend great rigidity to the entire structure.

On each side of the vehicle a wheel housing is formed above the interrupted portion of the lower channel 12 by an arcuate mud guard plate 25 and a vertical longitudinally extending plate 24 disposed outwardly from, and above the plate 17 and somewhat inwardly of the side of the vehicle. Each mud guard plate 25 extends upwardly from the channel 12 at point 14, thence forwardly over the wheels 51, thence downwardly to channel 12 at point 13. The ends of mud guard plates 25, in addition to being welded to the lower channels 12, are also welded to the transverse channels 15 and 16 so as to lend greater rigidity to the wheel housing structures. Each mud guard plate 25 extends horizontally inwardly from the side of the vehicle into abutting relationship with plate 24 on the corresponding side, to which it is welded. As most clearly shown in Fig. 1, the longitudinal plates 24 and the mud guard plates 25 form a substantially rectangular recess in each side of the vehicle, which recess is sufficiently large and deep to accommodate within it two wheels in tandem relation and allow clearance for the displacement of the wheels as the vehicle is propelled over the highway.

On each side of the vehicle a narrow plate 26 connecting, and extending horizontally between the lower edge of plate 24 and the upper edge of plate 17, and connected at its ends to transverse channels 15 and 16, forms, in conjunction with plate 17, what may be termed a walking beam housing. As shown more clearly in Fig. 2, the walking beam housing is substantially a rectangular recess below and inwardly offset from the lower edge of the wheel housing. Within each such recess operates a walking beam subsequently to be described.

Means are provided for supporting automobiles within the vehicle and include lower and upper sets of runways. The lower set of runways consists of two wide upwardly facing channels 27 extending longitudinally, one on either side of the vehicle, as shown in Figs. 5 and 6. Each channel 27 is horizontally disposed within the vehicle directly above the channels 18 and 19. With the channels 27 disposed so close to the axle of the vehicle, they would, if straight and continuous, interfere with the movement of the axle. Accordingly, a portion of each runway between points 27$^a$ and 27$^b$ is removed so as to form a gap in each channel 27 sufficiently wide to allow free upward movement of the axle 27, the U-bolts 55 and the plate 56. Due to the fact that the top surface of axle 21 is, in the normal position of the axle, approximately level with the channels 27 there is, as shown in Figs. 5 and 6, no substantial discontinuity in the runway, the axle 21, which is of rectangular section at that point, functioning as a runway between the points 27$^a$ and 27$^b$.

In the vicinity of the running gear housing each of the channels is welded to the side plates 17 and forwardly and rearwardly of the running gear housing each is supported on appropriate cross members. As shown in Fig. 1 the upper set of runways comprises two parallel tracks 28, disposed one on either side of the trailer near the top thereof forming an inclined runway up which a second automobile may be rolled into decked relationship with the automobile below, which rests on the lower set of channels 27. A number of other automobiles (not shown) may be similarly mounted in decked relationship rearwardly and forwardly of those shown. Chains or other appropriate means are supplied for securing the positioned automobiles to the vehicle.

The construction thus far described may be made up of standard steel plates and sections secured together by welding. If desired, the connections between members angularly disposed to one another may be reinforced by short angle pieces.

Referring to Figs. 3 and 4, the running gear includes a transverse axle 21 which extends between the plates 17 and projects through holes 29 centrally disposed in plates 17. Due to the fact that the wheels 51 are mounted on ends of walking beams 35, as will be subsequently described, the displacement of the axle is only half as great as the displacement of a wheel 51 as it rolls over an irregularity in the road. Inasmuch as the axle is subjected only to small displacement, the clearance between it and the frame need not be as great as in the conventional constructions. Because of this fact, the holes 29 in plate 17, through which the axle projects, need not be of very great diameter, nor will they detract substantially from the strength of plates 17.

Each end of the axle 21 is provided with two oppositely inclined beveled roller bearing races 31 and 32 spaced from one another a distance approximately four or five times the diameter of the axle 21 at that point. Each outer bearing race 31 is slidable over the end of axle 21. A cylindrical hub member 33 of circular cross section encircles each end of axle 21; is provided with bearing races complementary to races 31 and 32 of the axle 21, and extends inwardly beyond the inner bearing race 32. The hub member 33 is mounted on the end of axle 21 in the following manner: The outer bearing race 31 is removed. A roller bearing 34 is positioned on the inner bearing race 32. The hub member 33, together with the attached walking beams 35, subsequently to be described, is inserted over the end of the axle 21 until the inner bearing race of the hub member 33, the roller bearing 34 and the inner bearing race 32 of the axle 21 are in operative relationship. The outer roller bearings 36 and the outer roller bearing race 31 of the axle 21 are then inserted over the end of the axle 21 into operative relationship with the outer bearing race of the hub member 33. A nut 37 engaging the threaded end of axle 21 serves to keep in place the various elements of this rotatable mounting. A circular removable cap member 38 on the outer end of the hub member 33 and suitable packing 39 within the hub member 33 and inwardly of the inner bearing 34 retains the lubricant within the bearing and at the same time excludes foreign elements.

The inner end of the hub member 33 which extends inwardly beyond the inner roller bearing 34 is secured to the walking beam through two spaced circumferential flanges 41. As shown in Figs. 3 and 4 the sides of each walking beam 35 are formed by two vertical longitudinally extending side plates 42, each provided with a central circular aperture through which the hub member 33 projects. The plates 42 at the edges of the apertures are welded to the body of the hub member 33 and to the circumferential flanges 41 and thus secured in spaced parallel relationship. Narrow edge plates 44 extend between, and are welded to the edges of the side plates 42, forming in conjunction therewith a box like enclosure. Within that box like enclosure diagonal oppositely inclined bracing web members 45 and 46 extend between and are welded to the side plates 42 on each side of the hub member 33. With this truss like construction, the walking beam 35 and the hub member 33 form an integral structure of great rigidity capable of withstanding torsional warping or bending forces in all directions.

Because of the fact that the roller bearings 34 and 36 are considerably spaced from one another the rotatable mounting of the walking beam on the axle is well adapted to withstand any forces tending to displace or twist the axle in any direction.

As shown by Figs. 2, 3 and 4, stub axles 47 extend upwardly, thence outwardly from each end of each walking beam 35. The lower ends 48 of the stub axles 47 are preferably of rectangular cross section and fit neatly between the side plates 42 so that they may be welded to said side plates. On the upper end 49 of each stub axle 47 a wheel 51 is journaled in any suitable manner so that its axis of rotation is parallel to the axle 21. The stub axles 47 and the walking beams 31 are proportioned so that the axes of the wheels 51 are somewhat above the axle 21 and so that the wheels 51 operate in a plane parallel to, and intermediate the planes of rotation of the roller bearings 34 and 36.

As shown in Figs. 2 and 5, slots 52 are cut in plates 24 at points directly above the stub axles 47. Plates 26, extending on each side of the vehicle between plates 24 and 17, are interrupted at each of slots 52. Short plates 53 extend downwardly and inwardly from the upper edges of slots 52 to the upper edges of plates 17. In this manner additional clearance is provided for the vertically extending portion of the stub axles 47.

As shown in Figs. 3 and 5 the running gear supports the frame by means of longitudinally extending leaf springs 54 disposed inwardly of plates 17 on each side of the vehicle. The forward ends of leaf springs 54 are connected to the channel 18 and the rearward ends are connected to the channel 19. The axle 21 extends above the springs 54 and is rigidly bolted to each at its middle part by means of U-shaped rods 55 and a small top plate 56. The axle 21 is placed above the springs 54 rather than below, in order that the vehicle proper may be brought closer to the axle, thus reducing the overall height.

It will be seen from the foregoing description that a vehicle constructed in accordance with the invention herein disclosed will have more usable space than one constructed in a conventional manner. This results from the novel running gear construction, which brings the floor and lower frame members of the vehicle itself substantially below the axes of the wheels 51. This hanging of the vehicle from the wheels brings the center of gravity of the vehicle closer to the road and greatly enhances the safety of the device by minimizing the danger of tipping.

The provision of wheels 51 in tandem on the ends of the walking beams 35 greatly improves the riding quality of the vehicle, for as the vehicle is propelled over the highway, any irregularity is met first by the forward wheel of the tandem and then by the rearward one. As one of the wheels of the tandem rides over the irregularity, the displacement of the axle will be only half as great as that of the wheel itself, the walking beam tilting somewhat during the process. This manner of minimizing the displacement of the axle is important and advantageous, in that it permits a very small clearance between the axle and the frame of the vehicle. The provision of stub axles 47 which project outwardly and upwardly of the walking beams 35 reduces to a minimum the size of the housing necessary to accommodate the walking beams and thereby increases the usable space within the vehicle.

From the drawings, and particularly from Fig. 3, it will be noted that by reason of the fact that the axle 21 extends well into the wheel housing, the wheels 51 operate in a plane intermediate the planes of rotation of the bearings 34 and 36. In this way the bearings 34 and 36 are better able to withstand forces tending to misalign the wheels 51. The rigid construction of the walking beams 35 and the spaced relationship of the bearings 34 and 36 also contribute toward the fixed correct alignment of the wheels 51.

The leaf springs 54 which support the vehicle on the axle 21 serve to absorb the greater part of any of the shocks transmitted to the axle. This avoids the destructive jarring of the vehicle and its contents, which might otherwise occur as the vehicle is propelled over a rough road were the axle to be rigidly connected to the frame of the vehicle.

While I have described a preferred example of my invention that has proven highly practical and successful in actual use, it will be understood that many variations, changes and modifications thereof may be resorted to without departing from the principles of the invention.

I claim:

1. A vehicle frame including two longitudinally extending members one on each side of said vehicle frame at the extreme lower edges thereof, each of said longitudinally extending members being interrupted to form oppositely disposed gaps on either side of the vehicle of length sufficient to accommodate therein vehicle wheels in tandem, transverse members extending across the bottom of said frame at the forward and rearward portion of said gaps and connected to said longitudinally extending members, longitudinal plates one on each side of said vehicle disposed inwardly of said gaps each of said plates extending between and being joined to said transverse members, two spaced spring supporting members extending transversely between and connecting said longitudinal plates so as to furnish a spring connection and to prevent buckling of said longitudinal plates, said longitudinal plates each having an aperture through which an axle of said vehicle may project.

2. A vehicle including two spaced transverse members near the bottom of said vehicle and extending from one side thereof to the other, longitudinal members one on each side of said vehicle and disposed inwardly from the sides thereof, each of said longitudinal members extending between and being joined to said transverse members, a transverse axle centrally disposed between said transverse members, a spring connected to said vehicle, the middle portions of said spring extending below and being rigidly secured to said axle, a walking beam horizontally disposed on one side of said vehicle and rotatably mounted on an end of said axle, a stub axle mounted on and extending upwardly from an end of said walking beam, the end of said stub axle being bent so as to extend outwardly and horizontally, and a wheel on the end of said stub axle.

3. A vehicle including a transverse axle, a walking beam horizontally disposed on one side of said vehicle and rotatably mounted on an end of said axle, a stub axle of generally L-shaped form, one end of said stub axle extending downwardly and secured to an end of said walking beam, the other end of said stub axle being above said walking beam and extending horizontally and outwardly of said vehicle, and a wheel on the end of said stub axle.

4. In a running gear for vehicles of the class described a walking beam having spaced side members and oppositely inclined web members extending between and welded to said side members, a pair of stub axles each having a vertical portion extending into the space between said side members and each projecting upwardly from an end of said walking beam, the upper end of each stub axle being bent so as to extend outwardly and horizontally, and a wheel on the outwardly projecting end of each stub axle.

5. A vehicle including a transverse axle, a walking beam horizontally disposed on one side of said vehicle and rotatably mounted on an end of said axle by means of spaced oppositely inclined roller bearings, a stub axle having a vertical portion extending into said walking beam, and having its upper end bent so as to extend outwardly and horizontally, and a wheel on the end of said stub axle, said wheel being disposed in a plane parallel to and intermediate the planes of rotation of said bearings.

6. A vehicle including a transverse axle, a hub member rotatably mounted on an end of said transverse axle, said hub member extending inwardly from the end of said axle, a horizontal longitudinally extending walking beam rigidly secured near its central portion to the inner end of said hub member, a bent stub axle having its lower end projecting vertically into and secured to an end of said walking beam and having its upper end projecting horizontally and outwardly from said walking beam, and a wheel rotatably mounted on the end of said stub axle.

7. A vehicle including a transverse axle, a hub member rotatably mounted on an end of said transverse axle by means of spaced oppositely inclined roller bearings, said hub member extending inwardly from said roller bearings, a horizontal longitudinally extending walking beam rigidly secured near its central portion to the inner end of said hub member, a bent stub axle having its lower end projecting vertically into and secured to an end of said walking beam and having its upper end projecting horizontally and outwardly from said walking beam, and a wheel rotatably mounted on the end of said stub axle, said wheel being disposed in a plane parallel to and intermediate the planes of rotation of said bearings.

8. A running gear for a vehicle of the class described including a walking beam rotatably mounted on said vehicle, said walking beam including spaced side members and oppositely disposed web members extending between and welded to said side members, a bent stub axle having its lower end projecting vertically between said side members and secured thereto and having its upper end projecting horizontally and outwardly from said walking beam, and a wheel rotatably mounted on the end of said stub axle.

9. A walking beam structure for a vehicle of the character described, said structure including a longitudinally extending body portion, means in the center of said body portion for rotatably mounting the same on a transverse axle and an L-shaped stub axle at either end of said body portion, each of said stub axles having a substantially vertically extending part and an offset horizontal part projecting laterally outwardly from the top of said vertically extending part, each of said stub axles at the lower end of its vertically extending part projecting downwardly into and being secured within said longitudinally extending body portion and each of said stub axles being provided at the outward end of the laterally projecting part with means for rotatably mounting a wheel thereon.

10. A walking beam structure for a vehicle of the type described comprising a pair of side plates, edge plates extending between the edges of said side plates, a plurality of intermediate bracing web plates extending between the faces of said plates, said web plates and edge plates being integrally connected with said side plates and serving to hold the same in spaced relationship and a pair of stub axles positioned respectively near the forward and rearward end of said side plates, each of said stub axles being of generally L-shaped form and each having the lower end thereof extending vertically downwardly between said side plates and having the other end extending horizontally and outwardly, said other ends being provided with means for mounting a wheel thereon and each of said lower ends having two flat surfaces in contact with, and welded to, said side plates.

11. A walking beam structure for a vehicle of the type described including a longitudinally extending body portion, a hub member rigidly secured to the middle of said body portion and projecting laterally therefrom, said hub member being provided with oppositely inclined roller bearings adaptable for rotatable engagement with an axle, stub axles projecting laterally from either side of said body portion, and wheels rotatably mounted on said stub axles, the tread portion of said wheels being disposed in a plane parallel to and substantially intermediate the planes of rotation of said bearings.

LYNN M. FRANCIS.